(12) United States Patent
Sánchez De La Fuente et al.

(10) Patent No.: US 12,519,995 B2
(45) Date of Patent: Jan. 6, 2026

(54) FILE GENERATOR, FILE PARSER, METHODS AND VIDEO BITSTREAM WITH IMPROVED ACCESS UNIT DELIMITER, END OF SEQUENCE, END OF BITSTREAM AND FURTHER NON-VIDEO CODING LAYER NETWORK ACCESS LAYER UNITS

(71) Applicant: Fraunhofer-Gesellschaft zur Foerderung der angewandten Forschung e.V., Munich (DE)

(72) Inventors: Yago Sánchez De La Fuente, Berlin (DE); Robert Skupin, Berlin (DE); Cornelius Hellge, Berlin (DE); Thomas Schierl, Berlin (DE); Karsten Grueneberg, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 18/330,149

(22) Filed: Jun. 6, 2023

(65) Prior Publication Data
US 2024/0064352 A1      Feb. 22, 2024

Related U.S. Application Data

(63) Continuation of application No. PCT/EP2021/084860, filed on Dec. 8, 2021.

(30) Foreign Application Priority Data

Dec. 9, 2020    (EP) .................................... 20212902

(51) Int. Cl.
*H04N 21/24*       (2011.01)

(52) U.S. Cl.
CPC ............................... *H04N 21/2402* (2013.01)

(58) Field of Classification Search
CPC ............. H04N 21/2402; H04N 21/433; H04N 21/434; H04N 21/8451; H04N 21/85406;
(Continued)

(56) References Cited

U.S. PATENT DOCUMENTS

2010/0153395 A1   6/2010   Wang et al.
2017/0237999 A1   8/2017   Hendry et al.
(Continued)

FOREIGN PATENT DOCUMENTS

CN        102132562 A      7/2011
CN        108702518 A     10/2018
(Continued)

OTHER PUBLICATIONS

ISO/IEC, "[Uploaded in 4 parts] 14496-15:2019 CDAM 2 Carriage of VVC and EVC in ISOBMFF", [Part 1 of 4]130.MPEG meeting; Apr. 20, 2020-Apr. 24, 2020; Alpbach; (Motion Picture Expert Group or ISO/IEC JTC1/SC29/WG11), Apr. 30, 2020, No. n19278, Sections 11.6.2 and 11.6.3, XP030285538 (44 pp.), Apr. 30, 2020, pp. Cover-7.
(Continued)

*Primary Examiner* — Anthony Bantamoi
(74) *Attorney, Agent, or Firm* — Perkins Coie LLP; Michael A. Glenn

(57) ABSTRACT

A file parser for generating an output video bitstream from a file according to an embodiment is provided. The file parser is configured to receive the file being an input video bitstream, wherein the input video bitstream has a video encoded therein. The input video bitstream has a sample group, the sample group having a network abstraction layer unit; and/or the input video bitstream has an indication that an access unit of a plurality of access units of the input video
(Continued)

bitstream or a sample of a plurality of samples of the input video bitstream, which does not have the network abstraction layer unit, should have the network abstraction layer unit. The file parser is configured to generate the output video bitstream from the input video bitstream depending on the sample group.

20 Claims, 9 Drawing Sheets

(58) Field of Classification Search
CPC .... H04N 19/70; H04N 19/132; H04N 19/184; H04N 19/188; H04N 19/31
See application file for complete search history.

(56) References Cited

U.S. PATENT DOCUMENTS

| | | |
|---|---|---|
| 2020/0154116 A1 | 5/2020 | Wang |
| 2020/0351497 A1 | 11/2020 | Skupin et al. |

FOREIGN PATENT DOCUMENTS

| | | | |
|---|---|---|---|
| CN | 109155877 A | 1/2019 | |
| CN | 111771379 A | 10/2020 | |
| GB | 202005075 | 5/2020 | |
| GB | 2593897 A | 10/2021 | |
| IN | 201847037660 A | 11/2018 | |
| WO | 2015196028 A1 | 12/2015 | |
| WO | 2017205325 A1 | 11/2017 | |
| WO | WO-2019145262 A1 * | 8/2019 | ........... H04L 65/756 |
| WO | 2020229734 A1 | 11/2020 | |

OTHER PUBLICATIONS

ISO/IEC, "[Uploaded in 7 parts] 14496-12:2015 Information technology—Coding of audio-visual objects—Part 12: ISO base media file format", Section 8.9, Sample Group Structures; Annex A: Overview XP055836373 (248 pp.), Dec. 15, 2015, pp. Cover-24.
Sanchez, Yago, et al., "[8.1] Handling of EOS, EOB and AUD NAL Units", 133. MPEGmeeting; Jan. 11, 2021-Jan. 15, 2021; OnLine; (Motion Picture Expert Group or ISO/IECJTC1/SC29/WG11), Jan. 6, 2021, No. m56037, XP030290958, 5 pp.
ISO/IEC, 14496-12, seventh edition. Information technology—Coding of audio-visual object—Part12/ISO base media file format (15 pp).

* cited by examiner

FILE GENERATOR, FILE PARSER, METHODS AND VIDEO BITSTREAM WITH IMPROVED ACCESS UNIT DELIMITER, END OF SEQUENCE, END OF BITSTREAM AND FURTHER NON-VIDEO CODING LAYER NETWORK ACCESS LAYER UNITS

CROSS-REFERENCE TO RELATED APPLICATIONS

This application is a continuation of copending International Application No. PCT/EP2021/084860, filed Dec. 8, 2021, which is incorporated herein by reference in its entirety, and additionally claims priority from European Application No. 20212902.9, filed Dec. 9, 2020, which is also incorporated herein by reference in its entirety.

TECHNICAL FIELD

The present invention relates to a file generator, a file parser, methods and a video bitstream with improved access unit delimiter (AUD), end of sequence (EOS), end of bitstream (EOB) and further non-video coding layer (VCL) network access layer (NAL) units.

BACKGROUND

Versatile Video Coding (VVC) supports scalability of different forms. Bitstreams can be produced in such a way that they include temporal sub-layers (e.g., access units, AUs, that belong to different temporal levels) or even in layers (e.g., AUs that comprise pictures of different resolutions or different fidelity). When it comes to the systems integration, it is possible to split bitstreams such that sub-layers and/or layers are put into different tracks so that users with different capabilities (e.g., clients supporting only 30 fps or up to 60 fs) can be fed with the required NAL units only (e.g., a bitstream of 30 fps and a bitstream of 60 fps) by reading a different set of tracks.

SUMMARY

An embodiment may have a file parser for generating an output video bitstream from a file, wherein the file parser is configured to receive the file being an input video bitstream, wherein the input video bitstream has a video encoded therein, the input video bitstream comprising a sample group, wherein the sample group comprises a network abstraction layer unit; and/or wherein the input video bitstream comprises an indication that an access unit of a plurality of access units of the input video bitstream or a sample of a plurality of samples of the input video bitstream, which does not comprise the network abstraction layer unit, should comprise the network abstraction layer unit, wherein the file parser is configured to generate the output video bitstream from the input video bitstream depending on the sample group.

Another embodiment may have a file generator for generating a file, wherein the file generator is configured to receive an input video bitstream, wherein the input video bitstream has a video encoded therein, wherein the file generator is configured to generate the file being an output video bitstream from the input video bitstream, wherein the file generator is configured to generate the output video bitstream such that the output video bitstream comprises a sample group, the sample group comprising a network abstraction layer unit; and/or wherein the output video bitstream comprises an indication that an access unit of a plurality of access units of the output video bitstream or a sample of a plurality of samples of the output video bitstream, which does not comprise the network abstraction layer unit, should comprise the network abstraction layer unit.

Another embodiment may have a video bitstream, wherein the video bitstream has a video encoded therein, wherein the video bitstream comprises a sample group, the sample group comprising a network abstraction layer unit; and/or wherein the video bitstream comprises an indication that an access unit of a plurality of access units of the video bitstream or a sample of a plurality of samples of the video bitstream, which does not comprise the network abstraction layer unit, should comprise the network abstraction layer unit.

Another embodiment may have a method for generating an output video bitstream from a file, wherein the method comprises receiving the file being an input video bitstream, wherein the input video bitstream has a video encoded therein, the input video bitstream comprising a sample group, wherein the sample group comprises a network abstraction layer unit; and/or wherein the input video bitstream comprises an indication that an access unit of a plurality of access units of the input video bitstream or a sample of a plurality of samples of the input video bitstream, which does not comprise the network abstraction layer unit, should comprise the network abstraction layer unit, wherein the method comprises generating the output video bitstream from the input video bitstream depending on the sample group.

Another embodiment may have a method for generating a file, wherein the method comprises receiving an input video bitstream, wherein the input video bitstream has a video encoded therein, wherein the method comprises generating the file being an output video bitstream from the input video bitstream, wherein generating the output video bitstream is conducted such that the output video bitstream comprises a sample group, the sample group comprising a network abstraction layer unit; and/or wherein the output video bitstream comprises an indication that an access unit of a plurality of access units of the output video bitstream or a sample of a plurality of samples of the output video bitstream, which does not comprise the network abstraction layer unit, should comprise the network abstraction layer unit.

Still another embodiment may have a non-transitory digital storage medium having stored thereon a computer program for performing a method for generating an output video bitstream from a file, wherein the method comprises receiving the file being an input video bitstream, wherein the input video bitstream has a video encoded therein, the input video bitstream comprising a sample group, wherein the sample group comprises a network abstraction layer unit; and/or wherein the input video bitstream comprises an indication that an access unit of a plurality of access units of the input video bitstream or a sample of a plurality of samples of the input video bitstream, which does not comprise the network abstraction layer unit, should comprise the network abstraction layer unit, wherein the method comprises generating the output video bitstream from the input video bitstream depending on the sample group, when said computer program is run by a computer.

Another embodiment may have a non-transitory digital storage medium having stored thereon a computer program for performing a method for generating a file, wherein the method comprises receiving an input video bitstream, wherein the input video bitstream has a video encoded therein, wherein the method comprises generating the file being an output video bitstream from the input video bitstream, wherein generating the output video bitstream is conducted such that the output video bitstream comprises a sample group, the sample group comprising a network abstraction layer unit; and/or wherein the output video bitstream comprises an indication that an access unit of a plurality of access units of the output video bitstream or a sample of a plurality of samples of the output video bitstream, which does not comprise the network abstraction layer unit, should comprise the network abstraction layer unit, when said computer program is run by a computer.

According to another embodiment, a system may have: an inventive file parser as mentioned above, and an inventive file generator as mentioned before, wherein the file parser is configured to receive the output video bitstream being generated by the file generator as an input video bitstream.

According to another embodiment, a system may have: an inventive file parser as mentioned above, and a video decoder, wherein the video decoder is configured to receive the output video bitstream being generated by the file parser from the file parser, wherein a video is encoded within the output video bitstream, wherein the video decoder is configured to decode the video from the output video bitstream.

According to another embodiment, a system may have: a video encoder, and an inventive file generator as mentioned above, wherein the video encoder is configured to encode a video into a video bitstream, wherein the video encoder is configured to feed the video bitstream as an input video bitstream into the file generator, wherein the file generator is configured to generate the output video bitstream from the input video bitstream.

According to another embodiment, a system may have: a first system being a system, having: a video encoder, and a file generator for generating a file, wherein the file generator is configured to receive an input video bitstream, wherein the input video bitstream has a video encoded therein, wherein the file generator is configured to generate the file being an output video bitstream from the input video bitstream, wherein the file generator is configured to generate the output video bitstream such that the output video bitstream comprises a sample group, the sample group comprising a network abstraction layer unit; and/or wherein the output video bitstream comprises an indication that an access unit of a plurality of access units of the output video bitstream or a sample of a plurality of samples of the output video bitstream, which does not comprise the network abstraction layer unit, should comprise the network abstraction layer unit, wherein the video encoder is configured to encode a video into a video bitstream, wherein the video encoder is configured to feed the video bitstream as an input video bitstream into the file generator, wherein the file generator is configured to generate the output video bitstream from the input video bitstream, and a second system being an inventive system comprising an inventive file parser as mentioned above and a video decoder, wherein the second system is configured to receive the output video bitstream, being generated by the first system and having a video encoded therein, as an input video bitstream, and is configured to decode the video from the input video bitstream.

Another embodiment may have a client, wherein the client comprises an inventive file parser as mentioned above, wherein the client is to download a file from a server, wherein the file parser is configured to generate an output video bitstream from the file being downloaded from the server.

Another embodiment may have a server, wherein the server comprises an inventive file generator as mentioned above, wherein the file generator is to generate a file, wherein the server is configured to transmit the file to a client.

According to another embodiment, a system may have: an inventive server as mentioned above and an inventive client as mentioned above, wherein the server is to generate a file, wherein the client is to download the file from the server.

A file parser for generating an output video bitstream from a file according to an embodiment is provided. The file parser is configured to receive the file being an input video bitstream. The input video bitstream has a video encoded therein, wherein the input video bitstream comprises a sample group, the sample group comprising a network abstraction layer unit; and/or the input video bitstream comprises an indication that an access unit of a plurality of access units of the input video bitstream or a sample of a plurality of samples of the input video bitstream, which does not comprise the network abstraction layer unit, should comprise the network abstraction layer unit. Moreover, the file parser is configured to generate the output video bitstream from the input video bitstream depending on the sample group.

Moreover, a file generator for generating a file according to an embodiment is provided. The file generator is configured to receive an input video bitstream, wherein the input video bitstream has a video encoded therein. Moreover, the file generator is configured to generate the file being an output video bitstream from the input video bitstream. Furthermore, the file generator is configured to generate the output video bitstream such that the output video bitstream comprises a sample group, the sample group comprising a network abstraction layer unit; and/or the output video bitstream comprises an indication that an access unit of a plurality of access units of the output video bitstream or a sample of a plurality of samples of the output video bitstream, which does not comprise the network abstraction layer unit, should comprise the network abstraction layer unit.

Furthermore, a method for generating an output video bitstream from a file is provided. The method comprises receiving the file being an input video bitstream, wherein the input video bitstream has a video encoded therein, the input video bitstream comprising a sample group, wherein the sample group comprises a network abstraction layer unit; and/or wherein the input video bitstream comprises an indication that an access unit of a plurality of access units of the input video bitstream or a sample of a plurality of samples of the input video bitstream, which does not comprise the network abstraction layer unit, should comprise the network abstraction layer unit. Moreover, the method comprises generating the output video bitstream from the input video bitstream depending on the sample group.

Furthermore, a method for generating a file is provided. The method comprises receiving an input video bitstream, wherein the input video bitstream has a video encoded therein. Moreover, the method comprises generating the file being an output video bitstream from the input video bitstream. Generating the output video bitstream is conducted such that the output video bitstream comprises a sample group, the sample group comprising a network abstraction layer unit; and/or wherein the output video bitstream comprises an indication that an access unit of a plurality of access units of the output video bitstream or a sample of a plurality of samples of the output video bitstream, which does not comprise the network abstraction layer unit, should comprise the network abstraction layer unit.

Moreover, computer programs for implementing the above-described methods when being executed on a computer or signal processor are provided.

In embodiments, the file generator (file format packager, muxer) may, e.g., be subsequently employed after employing an encoder. A video decoder may, e.g., be subsequently employed after employing the file parser (demuxer). In embodiments, the elements of the video bitstream, e.g., EOS, EOB, AUD, may, e.g., remain unamended.

BRIEF DESCRIPTION OF THE DRAWINGS

In the following, embodiments of the present invention are described in detail with reference to the figures, in which.

DETAILED DESCRIPTION

Figure 1:
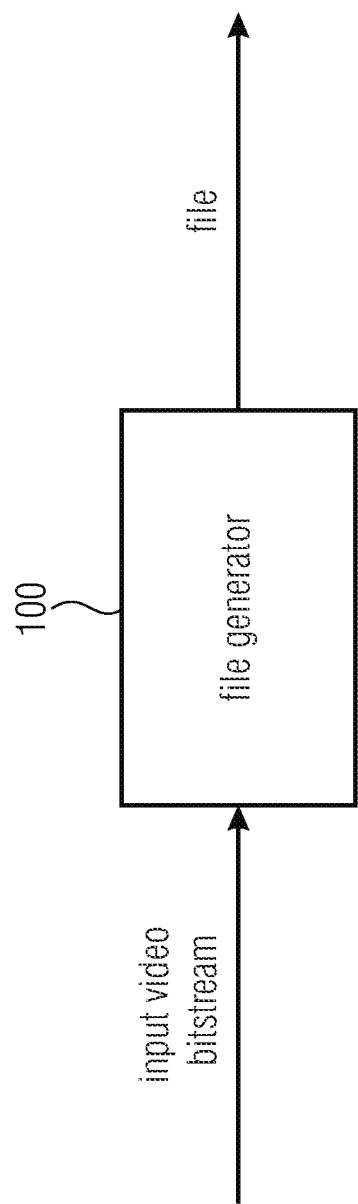
FIG. 1 illustrates a file generator for generating a file according to an embodiment.

FIG. 1 illustrates a file generator 100 for generating a file according to an embodiment. The file generator 100 is configured to receive an input video bitstream, wherein the input video bitstream has a video encoded therein. Moreover, the file generator 100 is configured to generate the file being an output video bitstream from the input video bitstream. Furthermore, the file generator 100 is configured to generate the output video bitstream such that the output video bitstream comprises a sample group, the sample group comprising a network abstraction layer unit; and/or the output video bitstream comprises an indication that an access unit of a plurality of access units of the output video bitstream or a sample of a plurality of samples of the output video bitstream, which does not comprise the network abstraction layer unit, should comprise the network abstraction layer unit.

Figure 2:
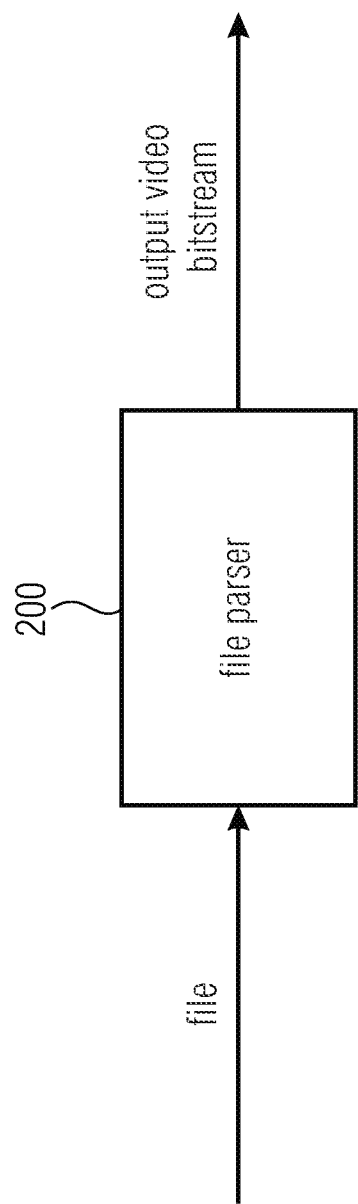
FIG. 2 illustrates a file parser for generating an output video bitstream from a file according to an embodiment.

FIG. 2 illustrates a file parser 200 for generating an output video bitstream from a file according to an embodiment. The file parser 200 is configured to receive the file being an input video bitstream. The input video bitstream has a video encoded therein, wherein the input video bitstream comprises a sample group, the sample group comprising a network abstraction layer unit, and/or the input video bitstream comprises an indication that an access unit of a plurality of access units of the input video bitstream or a sample of a plurality of samples of the input video bitstream, which does not comprise the network abstraction layer unit, should comprise the network abstraction layer unit. Moreover, the file parser 200 is configured to generate the output video bitstream from the input video bitstream depending on the sample group.

E.g., sample groups are file format structures having samples assigned to them and those samples may, e.g., represent/contribute to an access unit or picture unit in a reconstructed video bitstream when a parser reads the file format tracks.

Figure 3:
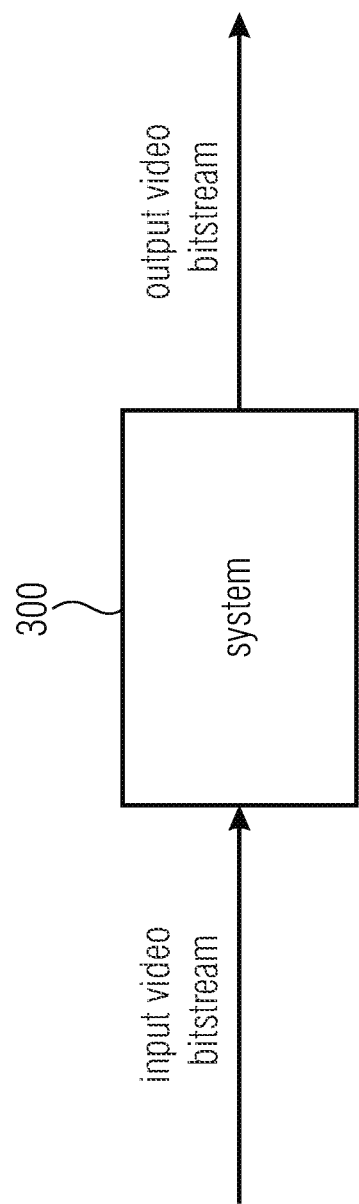
FIG. 3 illustrates a system, comprising the file generator of FIG. 1 and the file parser of FIG. 2.

FIG. 3 illustrates a system, comprising the file generator 100 of FIG. 1 and the file parser of FIG. 2. The file parser 200 is configured to receive the output video bitstream being generated by the file generator 100 as an input video bitstream.

In the following, embodiments are described in more detail, which discuss the video bitstream according to particular embodiments of the present invention.

The file generator 100 of FIG. 1 may, e.g., be configured to generate such a video bitstream as an output video bitstream.

The file parser of FIG. 2 may, e.g., be configured to generate an output video bitstream from such a video bitstream being an input video bitstream for the file parser 200.

Thus, in an embodiment, a video bitstream is provided. The video bitstream has a video encoded therein. The video bitstream comprises a sample group, the sample group comprising a network abstraction layer unit; and/or wherein the video bitstream comprises an indication that an access unit of a plurality of access units of the video bitstream or a sample of a plurality of samples of the video bitstream, which does not comprise the network abstraction layer unit, should comprise the network abstraction layer unit.

According to an embodiment, the sample group or information within the video bitstream, which is associated with the sample group, may, e.g., comprise length information indicating a length of the network abstraction layer unit.

In an embodiment, the network abstraction layer unit may, e.g., be an end of sequence network abstraction layer unit.

According to an embodiment, the sample group or information within the video bitstream, which is associated with the sample group, may, e.g., comprise the end of sequence network abstraction layer unit.

In an embodiment, the sample group or information within the video bitstream, which is associated with the sample group, may, e.g., comprise information on the end of sequence network abstraction layer unit, such that the end of sequence network abstraction layer unit may, e.g., be extractable from the sample group.

According to an embodiment, the sample group or information within the video bitstream, which is associated with the sample group, may, e.g., indicate an operating point for which a sample of the plurality of samples, which may, e.g., be associated with the sample group belongs to a last access unit in a coded layer-wise video sequence.

In an embodiment, the sample group or information within the video bitstream, which is associated with the sample group, may, e.g., comprise an index (ols_idx) and a temporal identifier (max_tid) to indicate the operating point for which the sample of the plurality of samples, which may, e.g., be associated with the sample group belongs to the last access unit in the coded layer-wise video sequence.

According to an embodiment, the video bitstream may, e.g., comprise at least the following parameters:
 ols_idx;
 max_tid;

ols_idx and max_tid indicate the operating point for which the sample of the plurality of samples, which may, e.g., be associated with the sample group belongs to the last access unit in the coded layer-wise video sequence.

According to an embodiment, the video bitstream may, e.g., comprise a signaling that indicates whether the end of sequence network abstraction layer unit applies only to an output layer set of a plurality of output layer sets with an index indicated by ols_idx or whether the end of sequence network abstraction layer unit applies to any output layer set of the plurality of output layer sets with an index from 0 to an upper bound index (ols_idx).

In an embodiment the video bitstream may, e.g., comprise at least the following parameters:
ols_idx;
max_tid;
lower_ols_idx_inclusive;
ols_idx and max_tid indicate the operating point for which the sample of the plurality of samples, which may, e.g., be associated with the sample group belongs to the last access unit in the coded layer-wise video sequence, lower_ols_idx_inclusive indicates whether the end of sequence network abstraction layer unit applies only to the output layer set with the index indicated through ols_idx or to any output layer set with the index from 0 to ols_idx.

In an embodiment, the video bitstream may, e.g., comprise the indication that said sample of the plurality of samples of the video bitstream, which does not comprise the network abstraction layer unit, should comprise the network abstraction layer unit, the network abstraction layer unit being an end of sequence network abstraction layer unit.

According to an embodiment, the sample group or information within the video bitstream, which is associated with the sample group, may, e.g., indicate a layer index of a layer of one or more layers and a maximum temporal index of the layer separately.

In an embodiment, the video bitstream may, e.g., comprise at least the following parameter:
max_tid;
max_tid indicates the operating point for which the sample of the plurality of samples, which may, e.g., be associated with the sample group belongs to the last access unit in the coded layer-wise video sequence.

In an embodiment, the network abstraction layer unit may, e.g., be an end of bitstream network abstraction layer unit.

According to an embodiment, the sample group or information within the video bitstream, which is associated with the sample group, may, e.g., comprise the end of bitstream network abstraction layer unit.

In an embodiment, the sample group or information within the video bitstream, which is associated with the sample group, may, e.g., comprise information on the end of bitstream network abstraction layer unit, such that the end of bitstream network abstraction layer unit may, e.g., be extractable from the sample group.

According to an embodiment, the sample group or information within the video bitstream, which is associated with the sample group, may, e.g., indicate an operating point for which a sample of the plurality of samples, which may, e.g., be assigned to the sample group, represents a last access unit in the video bitstream.

In an embodiment, the sample group or information within the video bitstream, which is associated with the sample group, may, e.g., comprise an index (ols_idx) and a temporal identifier (max_tid) to indicate the operating point for which the access unit of the plurality of access units, which may, e.g., be assigned to the sample group, may, e.g., be the last access unit in the video bitstream.

According to an embodiment, the video bitstream may, e.g., comprise at least the following parameters:
ols_idx;
max_tid;
ols_idx and max_tid indicate the operating point for which the access unit of the plurality of access units, which may, e.g., be assigned to the sample group, may, e.g., be the last access unit of the video bitstream.

According to an embodiment, the video bitstream may, e.g., comprise a signaling that indicates whether the end of bitstream network abstraction layer unit applies only to an output layer set of a plurality of output layer sets with an index indicated by ols_idx or whether the end of bitstream network abstraction layer unit applies to any output layer set of the plurality of output layer sets with an index from 0 to an upper bound index (ols_idx).

In an embodiment, the video bitstream may, e.g., comprise at least the following parameters:
ols_idx;
max_tid;
lower_ols_idx_inclusive;
ols_idx and max_tid indicate the operating point for which the access unit of the plurality of access units, which may, e.g., be assigned to the sample group, may, e.g., be the last access unit of the video bitstream, lower_ols_idx_inclusive indicates whether the end of bitstream network abstraction layer unit applies only to the output layer set with the index indicated through ols_idx or to any output layer set with the index from 0 to ols_idx.

In an embodiment, the video bitstream may, e.g., comprise the indication that said access unit of the plurality of access units of the video bitstream, which does not comprise the network abstraction layer unit, should comprise the network abstraction layer unit, the network abstraction layer unit being an end of bitstream network abstraction layer unit.

According to an embodiment, the network abstraction layer unit may, e.g., be an access unit delimiter network abstraction layer unit.

In an embodiment, the sample group or information within the video bitstream, which is associated with the sample group, may, e.g., comprise the access unit delimiter network abstraction layer unit.

According to an embodiment, the sample group or information within the video bitstream, which is associated with the sample group, may, e.g., comprise information on the access unit delimiter network abstraction layer unit, such that the access unit delimiter network abstraction layer unit may, e.g., be extractable from the sample group.

In an embodiment, the sample group or information within the video bitstream, which is associated with the sample group, may, e.g., indicate an output layer set for which an access unit of the plurality of access units, which may, e.g., be assigned to the sample group, needs the access unit delimiter included.

According to an embodiment, the sample group or information within the video bitstream, which is associated with the sample group, may, e.g., comprise an index (ols_idx) to indicate the output layer set for which the access unit of the plurality of access units, which may, e.g., be assigned to the sample group, needs the access unit delimiter included into the sample group.

In an embodiment, the video bitstream may, e.g., comprise at least the following parameter:
ols_idx;
wherein ols_idx indicates the output layer set for which the access unit of the plurality of access units, which may, e.g., be assigned to the sample group, needs the access unit delimiter included into the sample group.

In an embodiment, the video bitstream may, e.g., comprise a signaling that indicates whether the access unit delimiter network abstraction layer unit applies only to an output layer set of a plurality of output layer sets with an index indicated by ols_idx or whether the access unit delimiter network abstraction layer unit applies to any output layer set of the plurality of output layer sets with an index from 0 to an upper bound index (ols_idx).

According to an embodiment, the video bitstream may, e.g., comprise at least the following parameters:
ols_idx;
lower_ols_idx_inclusive;
ols_idx indicates the output layer set for which the access unit of the plurality of access units, which may, e.g., be assigned to the sample group, needs the access unit delimiter included into the sample group, lower_ols_idx_inclusive indicates whether the access unit delimiter network abstraction layer unit applies only to the output layer set with the index indicated through ols_idx or to any output layer set with the index from 0 to ols_idx.

According to an embodiment, the video bitstream may, e.g., comprise the indication that said access unit of the plurality of access units of the video bitstream, which does not comprise the network abstraction layer unit, should comprise the network abstraction layer unit, the network abstraction layer unit being an access unit delimiter network abstraction layer unit.

In an embodiment, the network abstraction layer unit may, e.g., be a non-video coding layer network abstraction layer unit.

According to an embodiment, the sample group or information within the video bitstream, which is associated with the sample group, may, e.g., comprise the non-video coding layer network abstraction layer unit.

In an embodiment, the sample group or information within the video bitstream, which is associated with the sample group, may, e.g., comprise information on the non-video coding layer network abstraction layer unit, such that the non-video coding layer network abstraction layer unit may, e.g., be extractable from the sample group.

According to an embodiment, the sample group or information within the video bitstream, which is associated with the sample group, may, e.g., indicate an operating point for which an access unit of the plurality of access units, which may, e.g., be assigned to the sample group, has a non-video coding layer network abstraction layer unit associated.

In an embodiment, the sample group or information within the video bitstream, which is associated with the sample group, may, e.g., comprise an index (ols_idx) and a temporal identifier (max_tid) to indicate the operating point for which the access unit of the plurality of access units, which may, e.g., be assigned to the sample group, has the non-video coding layer network abstraction layer unit associated.

According to an embodiment, the video bitstream may, e.g., comprise a signaling that indicates whether the non-video coding layer network abstraction layer unit applies only to an output layer set of a plurality of output layer sets with an index indicated by ols_idx or whether the non-video coding layer network abstraction layer unit applies to any output layer set of the plurality of output layer sets with an index from 0 to an upper bound index (ols_idx).

In an embodiment, the video bitstream may, e.g., indicate a position in an access unit where the non-video coding layer network abstraction layer unit needs to be inserted.

According to an embodiment, the video bitstream may, e.g., comprise at least the following parameters:
ols_idx;
max_tid;
lower_ols_idx_inclusive;
ols_idx and max_tid indicate the operating point for which the access unit of the plurality of access units, which may, e.g., be assigned to the sample group, has the non-video coding layer network abstraction layer unit associated, lower_ols_idx_inclusive indicates whether the non-video coding layer network abstraction layer unit applies only to the output layer set with the index indicated through ols_idx or to any output layer set with the index from 0 to ols_idx.

According to an embodiment, if two or more non-video coding layer network abstraction layer units are mapped to a same access unit, the video bitstream indicates an order among the two or more non-video coding layer network abstraction layer units.

In an embodiment, the video bitstream may, e.g., comprise the indication that said access unit of the plurality of access units of the video bitstream, which does not comprise the network abstraction layer unit, should comprise the network abstraction layer unit, the network abstraction layer unit being an non-video coding layer network abstraction layer unit.

In the following, particular embodiments of the present invention are described in detail.

As already outlined, Versatile Video Coding supports scalability of different forms. Bitstreams can be produced in such a way that they include temporal sub-layers (e.g., AU that belong to different temporal levels) or even in layers (e.g., AUs that comprise pictures of different resolutions or different fidelity). When it comes to the systems integration, it is possible to split bitstreams such that sub-layers and/or layers are put into different tracks so that users with different capabilities (e.g., clients supporting only 30 fps or up to 60 fs) can be fed with the required NAL units only (e.g., a bitstream of 30 fps and a bitstream of 60 fps) by reading a different set of tracks.

The encapsulation of one such bitstreams in the file format (ISO Base Media File Format; ISOBMFF) is illustrated in the following FIG. 4 and FIG. 5.

Figure 4:
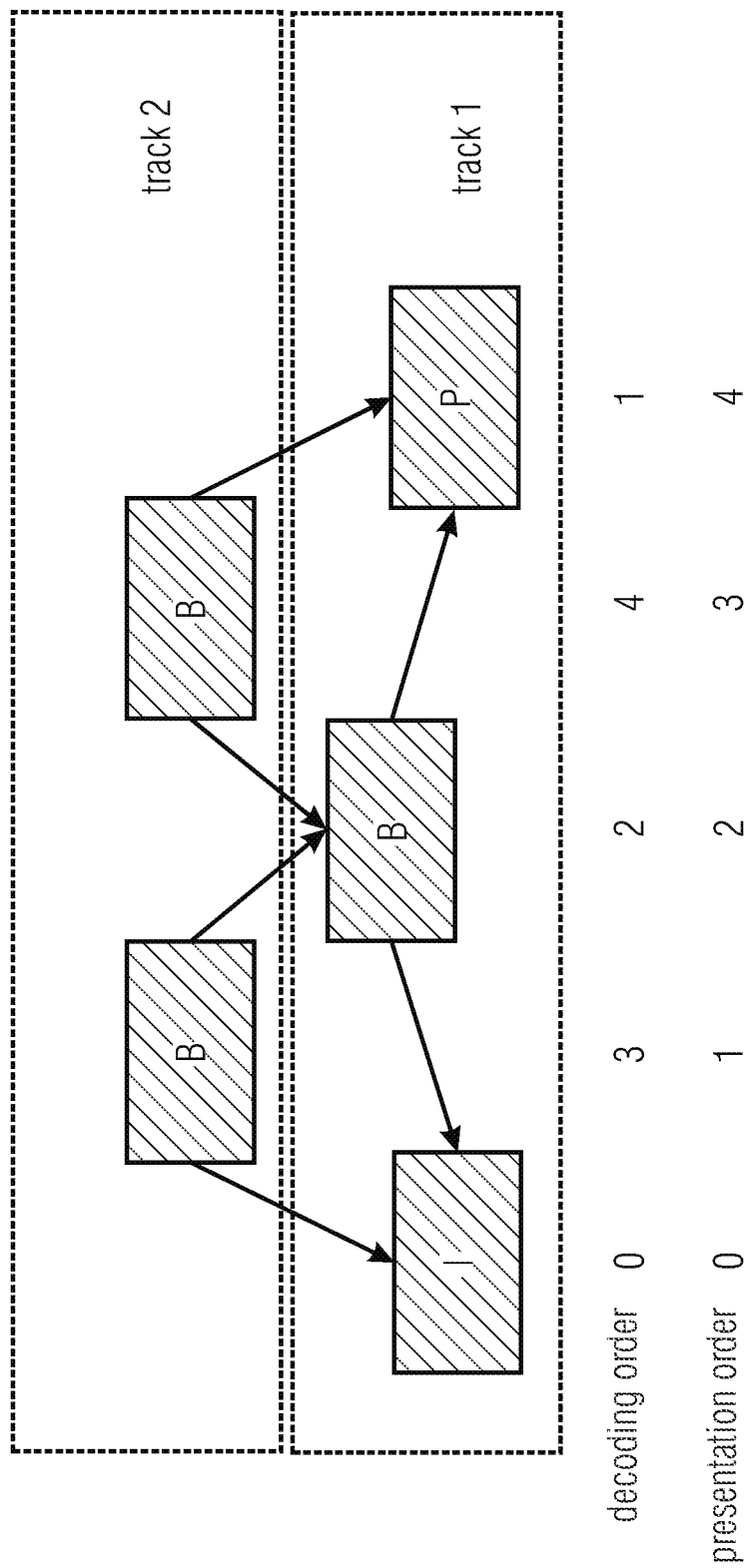
FIG. 4 illustrates temporal sublayers per track VVC FF encapsulation.

FIG. 4 illustrates temporal sublayers per track VVC FF (VVC file format) encapsulation.

Figure 5:
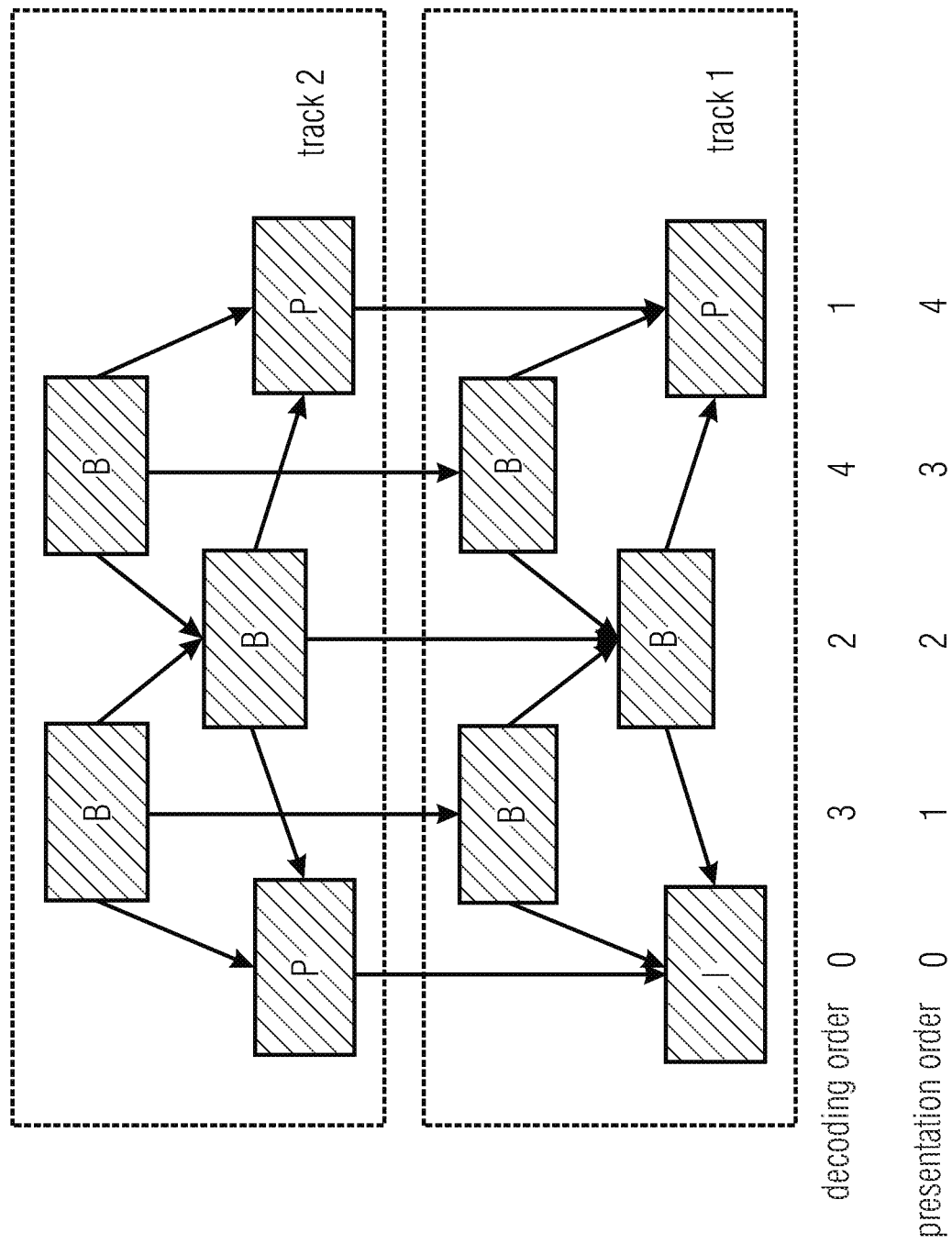
FIG. 5 illustrates layers per track VVC FF encapsulation.

FIG. 5 illustrates layers per track VVC FF encapsulation.

First, an important distinction is drawn as to the peculiarities of the terms Access Unit (AU), Picture Unit (PU) and sample. AU and PU are terms of video coding specifications such as H.266 to collectively refer to NAL units of a video bitstream associated to a particular presentation time (i.e. picture output by a video decoder). While PU comprises only the NAL units that belong to a particular single layer, an AU may encompass also different layers in case of multi-layer video (e.g. when spatial scalability or the like is employed) and therefore NAL units of multiple separate PUs. PUs consist of network abstraction layer (NAL) units that carry a header and a payload.

For example, a particular example syntax for a header according to a particular, non-limiting embodiment, is shown below, under Sample Code, Example 1.

NAL units can be further classified as belonging to the Video Coding Layer (VCL), e.g. when they comprise coded values of luma samples or pixels of the video, and the non-VCL data, e.g. decoder control data such as an indication of some bitstream structures end.

While the payload of some non-VCL NAL units can be carrying further such as for the Access Unit delimiter NAL unit type, other non-VCL NAL units such as the End-of-Bitstream or the End-of-Sequence NAL unit types are empty as seen from the following tables.

For example, a particular example syntax for an access unit delimiter according to a particular, non-limiting embodiment, is shown below, under Sample Code, Example 2.

A sample, in FF terminology is a structure in which media data such as the NAL units of a video bitstream are stored and they are associated to a particular track within the file format. Samples are also associated to a single presentation time instant, but may or may not encompass multiple layers.

When a parser or demuxer aggregates samples (or the NAL units therein) to reconstruct AUs of the video bitstream from a set of tracks belonging to a certain operation point (layers belonging to a particular Output Layer Set (OLS) with a highest sublayer TemporalID), it needs the NAL units from tracks carrying lower sublayers (e.g., those for which the VCL NAL units have smaller TemporalId) and from tracks carrying picture units (NAL units of a particular layer of the AU) from samples having the same decoding time, and are placed into the access unit. Indication of the required tracks is given either by track references or with an indication of which tracks belong to an operation point. The reconstructed AUs are placed into the VVC bitstream in increasing order of decoding time, and picture units within an AU are placed in increasing nuh_layer_id order.

Some non-VCL NAL units require special handling that complicate the reconstruction process, in particular, the access unit delimiter (AUD), the end-of-sequence (EOS) and end-of-bitstream NAL units (EOB). Additional non-VCL NAL units could have similar issues.

The issue with the AUD NAL unit in a scalable bitstream is illustrated in the following FIG. 6.

Figure 6:
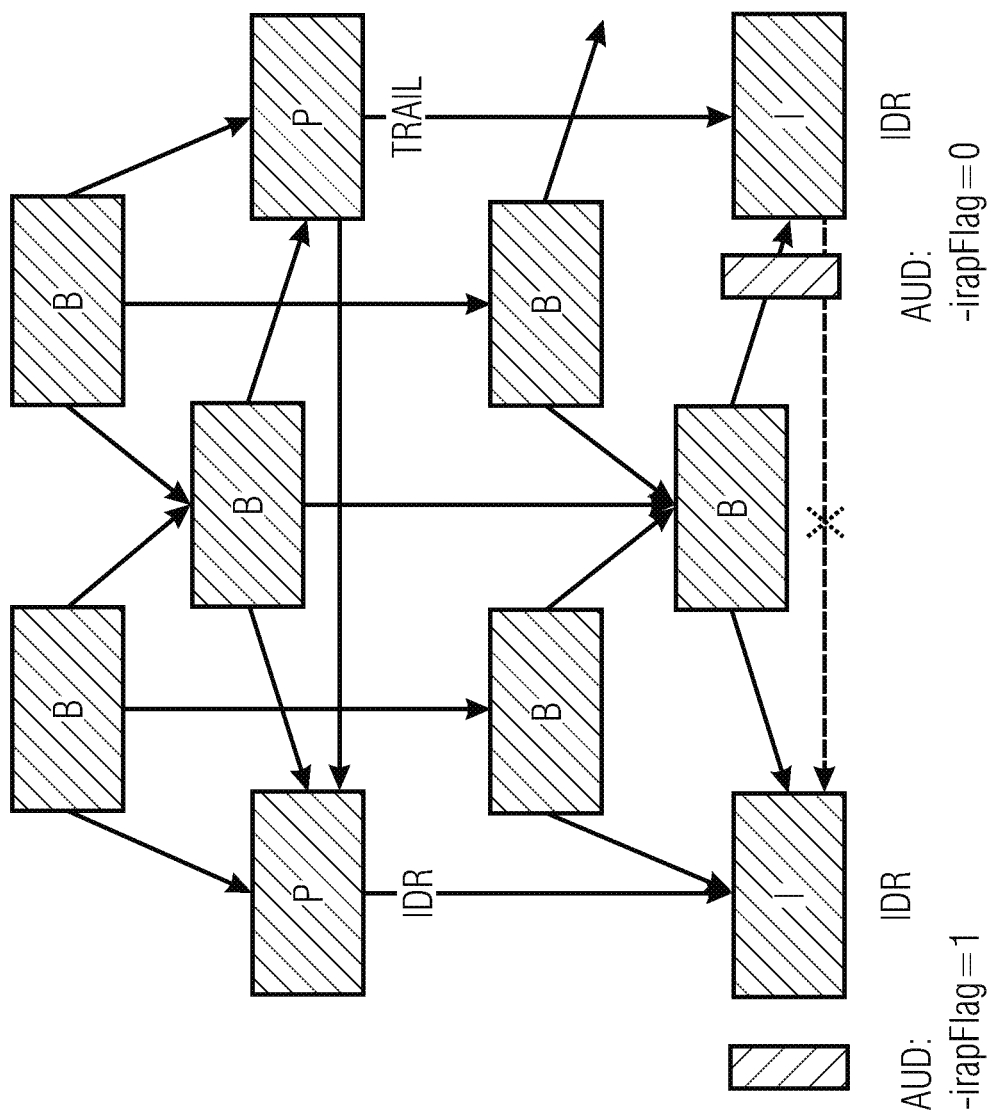
FIG. 6 illustrates an AUD placement, wherein letters in boxes denote slice type. AUD, IDR, TRAIL denote NAL unit types.

FIG. 6 illustrates an AUD placement, wherein letters in boxes denote slice type. AUD, IDR, TRAIL denote NAL unit types.

The AUD comprises an indication (irapFlag in the Figure) whether the AU is an RAP AU (Intra Random Access Point AU), e.g., whether all picture units of all layers within the AU are of RAP type. In the example in FIG. 6 with two layers, it is shown that the first AU is an RAP AU (irapFlag=1) but the rightmost AU is not, as only the picture unit in layer 0 is of RAP type (hence irapFlag=0).

Figure 7:
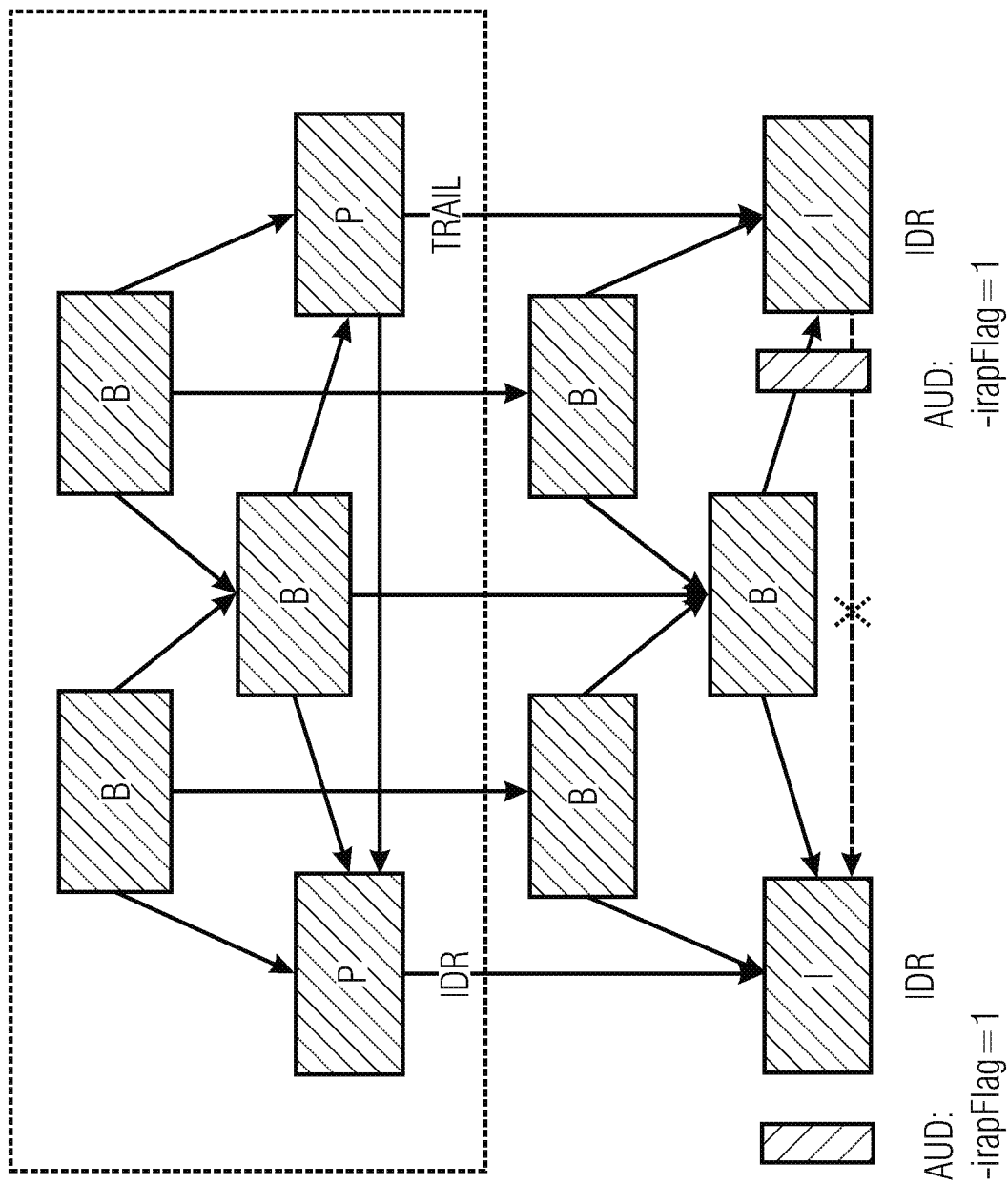
FIG. 7 illustrates an AUD irap flag setting when lower sublayer only is considered.

FIG. 7 illustrates an AUD RAP flag setting when lower sublayer only is considered, e.g., extracted subbitstream.

However, when only layer 0 is send to the decoder as shown through shading in FIG. 7, the rightmost AU becomes an RAP AU and therefore the AUD needs to indicate that such an AU is an RAP (irapFlag=1).

In VVC, there can be only a single AUD NAL unit per AU. This means that the current solution requires including such a NAL unit in each of the tracks, and the reconstruction process needs to parse the aggregated bitstream, search for such NAL units and pick the correct one and drop the rest, which brings along a complexity for the parser, that needs to understand particular NAL unit syntax element values, and potentially check some syntax element values to see whether the signalling included therein is correct.

Figure 8:
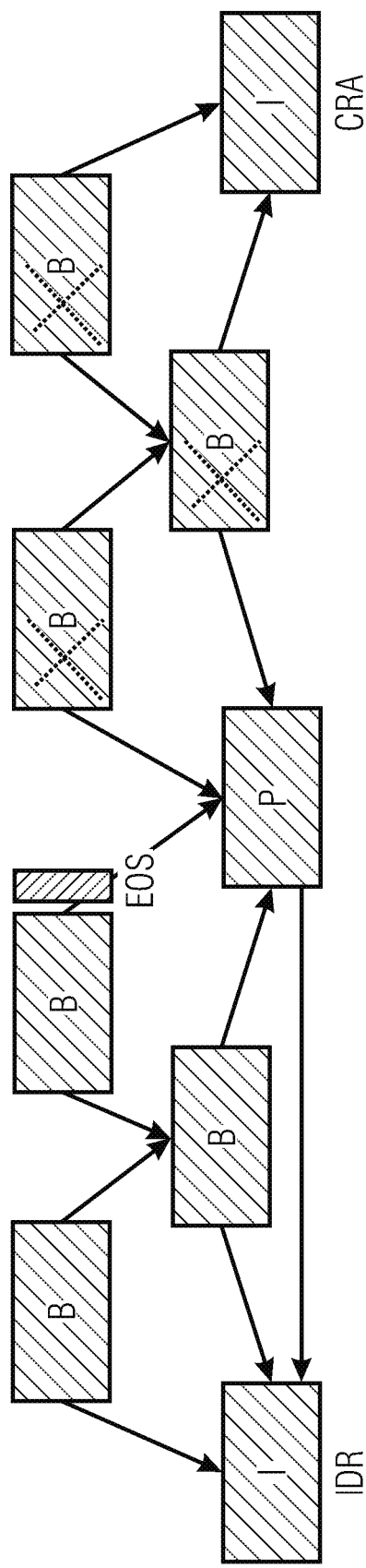
FIG. 8 illustrates an EOS NAL unit placement in a VVC bitstream with temporal scalability.

Another issue with the EOS NAL unit in VVC is illustrated in FIG. 8.

FIG. 8 illustrates an EOS NAL unit placement in a VVC bitstream with temporal scalability.

The EOS NAL unit has to be placed directly before the CRA NAL unit (Clean Random Access Point NAL unit) in decoding order, which means that when all sublayers are sent to the decoder the EOS NAL unit comes within the AU of one the B slices of the higher temporal sublayer indicated in FIG. 8.

Figure 9:
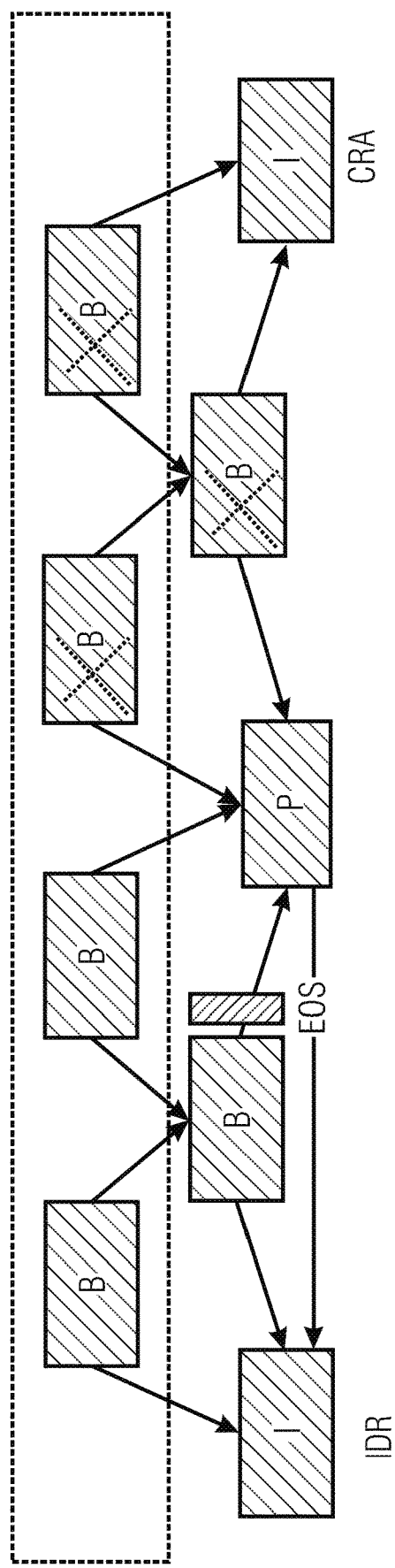
FIG. 9 illustrates an EOS NAL unit placement when sublayers are dropped.

FIG. 9 illustrates an EOS NAL unit placement when sublayers are dropped.

However, when the highest sublayer is not included in the bitstream as indicated in FIG. 9, the EOS NAL unit needs to be included into the directly preceding AU in a lower sublayer. Currently, the EOS NAL unit is included into samples representing several AUs when the bitstream is split into several FF tracks during FF packaging and the FF parser needs to look for unnecessary (e.g., non-conforming) EOS NAL units and drop them. E.g., only one of the EOS NAL units shall be kept in the last of these access units (the one with the greatest decoding time) in the final reconstructed bitstream, placed after all NAL units, except the EOB NAL unit (when present, due EOBs higher precedence), of the last of these access units, and other EOS NAL units are discarded.

A similar issue happens with the EOB NAL unit when temporal sub-layers of the video are distributed to different FF track during FF packaging. There may be more than one of such tracks comprising an EOB NAL unit in the respective samples. In this case, only one of the EOB NAL units shall be kept in the final reconstructed bitstream, placed at the end of the last of these access units, and other EOB NAL units are discarded.

Similar issues could even happen when considering a single-track bitstream. The ISOBMFF allows for marking different levels to different parts of a bitstream, e.g., using the 'leva' box, where it can be specified that the different applicable levels are differentiated by using sample group signalling. For instance, in combination with the 'tele' box that identifies the temporal level of a particular sample. Thus, a parser could use that information to collect only the NAL units up to a certain temporal level (i.e., the respective temporal sub-layers) as shown in the example above, where the placement of EOS NAL unit or EOB NAL unit requires further knowledge of whether the dropped AUs (samples) do or do not comprise such a NAL unit.

In order to solve such an issue the following embodiments are presented.

In one embodiment, the file format parser adds a signalling that maps particular AUs to potentially have included an EOS NAL unit. A new sample group is defined that indicates that a particular AU would comprise a EOS NAL unit if the reconstructed bitstream corresponds to a particular operating point.

For example, a particular example syntax for an end of sequence sample entry according to a particular, non-limiting embodiment, is shown below, under Sample Code, Example 3.

For example, parameters:
ols_idx and max_tid may, e.g., indicate the operating point for which the mapped sample is the last sample of a CLVS.
eosNalUnitLength may, e.g., indicate the length in bytes of the EOS NAL unit.
eosNalUnit may, e.g., comprise an EOS NAL unit as specified in ISO/IEC 23090-3.
(CLVS=coded layer-wise video sequence)

For example, the EOS NAL unit may, e.g., included within the sample group. However, the generation of the EOS NAL unit could be left for the parser and could be not included and just an indication that a EOS NAL unit may need to be added to the sample could be simply provided.

A track that uses the described sample grouping mechanism does not comprise EOS NAL units in the samples stored in the track. Only tracks that are not mapped to such a sample group are allowed to have an EOS NAL unit within the samples of the track.

A parser then needs to include an EOS NAL unit (included as payload into the sample group as eosNalUnit) in the reconstructed bitstream portion that corresponds to a sample mapped to this sample group if the operating point reconstructed corresponds to ols_idx and max_tid. I.e. a parser resolves the sample group mapping of a particular sample it encouters when reading a track and in case of the above invented sample group is instructed to insert the signaled EOS NAL unit into the reconstructed bitstream. This consideration also applies to the other embodiments in this invention. Alternatively, if the video decoder API allows to provide the variable that indicates that the next picture unit in the particular layer is the first PU of a new CLVS (e.g., HandleCraAsClvsStartFlag) the EOS NAL unit can be omitted and the decoder is provided with the described variable at the sample following the mapped sample.

From a file format packager perspective given a particular input video bitstream and a configuration defining which tracks are to be written, the invention includes writing the correct sample groups and assignment of individual samples of the tracks to ensure that a file format parser reading the tracks associated to a certain operation point can reconstruct a conforming video bitstream from the samples of the tracks by resolving the invented sample group mapping and writing corresponding EOS NAL units at the appropriate positions. This consideration also applies to the other embodiments in this invention.

In another embodiment, a new sample group is defined that indicates that a particular AU would comprise a EOB NAL unit if the reconstructed bitstream corresponds to a particular operating point.

For example, a particular example syntax for an end of bitstream sample entry according to a particular, non-limiting embodiment, is shown below, under Sample Code, Example 4.

For example, parameters:
ols_idx and max_tid may, e.g., indicate the operating point for which the mapped sample is the last sample of the bitstream.
eobNalUnitLength may, e.g., indicate the length in bytes of the EOB NAL unit.
eobNalUnit may, e.g., comprise an EOB NAL unit as specified in ISO/IEC 23090-3.

Similar as discussed above for the EOS NAL unit, for example, the EOB NAL unit may, e.g., be included within the sample group. However, the generation of the EOB NAL unit could be left for the parser and could be not included and just an indication that a EOB NAL unit may need to be added to the sample could be simply provided.

A difference from the video bitstream perspective between EOS NAL units and EOB NAL units is that the EOS NAL unit is layer specific and the EOB NAL unit is Bitstream/OLS specific, i.e. its scope encompasses all layers included in the operation point represented by the bitstream. Therefore, a particular AU can only comprise one EOB NAL unit but several EOS NAL units (for each layer). Once a parser encounters a sample assigned to sample group 'eob' matching its operation point, it doesn't need to resolve other 'eob' samples, as the EOB NAL unit is put into that sample already.

The described difference if EOS and EOB NAL units, could lead to a different parser behavior for the case that the EOS NAL unit is not included in the payload of the new sample group described above. More concretely, the layer_id of the layer at which a EOS NAL unit is required would be needed (EOS NAL units do not need to be present in all layers). Therefore, for such a case the 'eos' sample group could look different to the case shown above.

For example, a particular example syntax for an end of sequence sample entry according to a particular, non-limiting embodiment, is shown below, under Sample Code, Example 5.

For example, this sample group may, e.g., indicate the layer_id and max_tid for each layer separately. Thus the parser may, e.g., need to identify the value of layer_id and max_tid(layer specific) given an operating points corresponding to a particular ols_idx and max_tid(ols global, i.e. maximum value among all layers in the OLS) and put the EOS into the AU for each required layer. Although, such a syntax makes more sense for the case that the sample group not including the EOS NAL unit, it could also be used for the case that the sample group does include the EOS NAL unit and serve just as an alternative syntax.

The layer_id signalling does not only provide an indication of the applicable operation point but is also used by the parser to generate the EOS NAL unit in the reconstructed bitstream, E.g. by setting the nuh_layer_id of the respective NAL unit header to the value of indicated layer_id in the sample group.

In cases for which there are unequal random access point (RAP) periods in the layers of a multi-layer bitstream, AUD need to be changed depending on the operation point as described in the figures above and therefore stored at multiple tracks requiring removal of some AUDs when NAL units of different tracks that belong to the same AU are aggregated. In another embodiment, as described for EOS NAL units and EOB NAL units, an AUD sample group could be used to insert the proper AUD NAL unit depending on the operating point. However, in this case, only the OLS is needed as the AUD NAL unit does not change depending on the maximum sublayer that is included.

For example, a particular example syntax for an AUD sample entry according to a particular, non-limiting embodiment, is shown below, under Sample Code, Example 6.

For example, parameters:
ols_idx may, e.g., indicate the output layer set for which the mapped sample needs the AUD payload included into the sample group.
audNalUnitLength may, e.g., indicate the length in bytes of the AUD NAL unit.
audNalUnit may, e.g., comprise an AUD NAL unit as specified in ISO/IEC 23090-3.

In another embodiment, a generic mechanism for any non-VCL NAL unit is provided, so that a single sample group is used.

For example, a particular example syntax for a VCL sample entry according to a particular, non-limiting embodiment, is shown below, under Sample Code, Example 7.

For example, parameters:
ols_idx and max_tid may, e.g., indicate the operating point for which the mapped has the non-VCL Nal units associated.
positionInAU may, e.g., indicate the position in the AU where the non-VCL NAL unit needs to be inserted, e.g., 0=first NAL unit in AU, 1=before the first VCL NAL unit, 2=after the last VCL NAL unit.

lower_ols_idx_inclusive may, e.g., indicate whether the non-VCL NAL unit applies only to the OLS with index indicated through ols_idx or to any OLS with index from 0 . . . ols_idx.

nonVclNalUnitLength may, e.g., indicate the length in bytes of the non-VCL NAL unit.

nonVclNalUnit may, e.g., comprise a nonVCL NAL unit as specified in ISO/IEC 23090-3.

Since there might be different non-VCL NAL units that are mapped to the same sample and the order is strictly defined in the VVC specification, it might be desirable not only to indicate the relation to the other NAL units included in the track (see position InAU) but also its position among the ones to be inserted, e.g. in case multiple non-VCL NAL units of different types are to be inserted. E.g, with a order_idx attribute that would imply that given two non-VCL NAL units to be inserted in a sample at the same position, the one with lower order_idx would come before the one with a higher order_idx.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

Sample Code

Sample Code, Example 1

|  | Descriptor |
|---|---|
| nal_unit_header( ) { | |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } | |

Sample Code, Example 2

| | Descriptor |
|---|---|
| access_unit_delimiter_rbsp( ) { | |
|     aud_irap_or_gdr_flag | u(1) |
|     aud_pic_type | u(3) |
|     rbsp_trailing_bits( ) | |
| } | |
| end_of_seq_rbsp( ) { | |
| } | |
| end_of_seq_rbsp( ) { | |
| } | |

Sample Code, Example 3

```
class EndOfSequenceSampleEntry( )
extends VisualSampleGroupEntry ('eos ')
{
  unsigned int(9) ols_idx;
  unsigned int(3) max_tid;
  unsigned int(4) reserved;
  unsigned int(16) eosNalUnitLength;
  bit(8*eosnalUnitLength) eosNalUnit;
}
```

Sample Code, Example 4

```
class EndOfBitstreamSampleEntry( )
extends VisualSampleGroupEntry ('eob ')
{
  unsigned int(9) ols_idx;
  unsigned int(3) max_tid;
  unsigned int(4) reserved;
  unsigned int(16) eobNalUnitLength;
  bit(8*eobnalUnitLength) eobNalUnit;
}
```

Sample Code, Example 5

```
class EndOfSequenceSampleEntry( )
extends VisualSampleGroupEntry ('eos ')
{
  unsigned int(9) layer_id;
  unsigned int(3) max_tid;
  unsigned int(4) reserved;
}
```

Sample Code, Example 6

```
class AUDSampleEntry( ) extends
VisualSampleGroupEntry ('aud ')
{
  unsigned int(9) ols_idx;
  unsigned int(7) reserved;
  unsigned int(16) audNalUnitLength;
  bit(8*audnalUnitLength) audNalUnit;
}
```

Sample Code, Example 7

```
class nonVCLSampleEntry( ) extends
VisualSampleGroupEntry ('nvcl')
{
  unsigned int(9) ols_idx;
  unsigned int(3) max_tid;
  unsigned int(2) positionInAU;
  unsigned int(1) lower_ols_idx_inclusive;
  unsigned int(1) reserved;
  unsigned int(16) nonVclNalUnitLength;
  bit(8*nonVclNalUnitLength) nonVclNalUnit;
}
```

REFERENCES

[1] ITU-T. Versatile video coding (VVC). ITU-T Recommendation H.266, version 1, 08/2020.

[2] ISO/IEC 14496-12:2015 Information technology—Coding of audio-visual objects—Part 12: ISO base media file format.

The invention claimed is:

1. A file parser for generating an output video bitstream from a file,
wherein the file parser is configured to receive the file being an input video bitstream, wherein the input video bitstream has a video encoded therein, the input video bitstream comprising a sample group, wherein the sample group comprises a network abstraction layer unit; and/or wherein the input video bitstream comprises an indication that an access unit of a plurality of access units of the input video bitstream or a sample of a plurality of samples of the input video bitstream, which does not comprise the network abstraction layer unit, should comprise the network abstraction layer unit,
wherein the file parser is configured to generate the output video bitstream from the input video bitstream depending on the sample group,
wherein the network abstraction layer unit is an end of sequence network abstraction layer unit, and
wherein the sample group or information within the input video bitstream, which is associated with the sample group, indicates an operating point for which a sample of the plurality of samples, which is associated with the sample group belongs to a last access unit in a coded layer-wise video sequence.

2. A file parser according to claim 1,
wherein the sample group comprises length information indicating a length of the network abstraction layer unit.

3. A file parser according to claim 1,
wherein the sample group or information within the input video bitstream, which is associated with the sample group, comprises an index and a temporal identifier to indicate the operating point for which the sample of the plurality of samples, which is associated with the sample group belongs to the last access unit in the coded layer-wise video sequence.

4. A file parser according to claim 3,
wherein the video bitstream comprises at least the following parameters:
ols_idx;
max_tid;

wherein ols_idx and max_tid indicate the operating point for which the sample of the plurality of samples, which is associated with the sample group belongs to the last access unit in the coded layer-wise video sequence.

5. A file parser according to claim 4,
wherein the sample group is defined based on a class definition which is defined as follows:

```
class EndOfSequenceSampleEntry( )
extends VisualSampleGroupEntry ('eos ')
{
   unsigned int(9) ols_idx;
   unsigned int(3) max_tid;
   unsigned int(4) reserved;
   unsigned int(16) eosNalUnitLength;
   bit(8*eosnalUnitLength) eosNalUnit;
}
``` eosNalUnitLength indicates the length in bytes of the end of sequence network abstraction layer unit,
eosNalUnit comprises the end of sequence network abstraction layer unit as specified in ISO/IEC 23090-3.

6. A file parser according to claim 3,
wherein the input video bitstream comprises a signaling that indicates whether the end of sequence network abstraction layer unit applies only to an output layer set of a plurality of output layer sets with an index indicated by ols_idx or whether the end of sequence network abstraction layer unit applies to any output layer set of the plurality of output layer sets with an index from 0 to an upper bound index.

7. A file parser according to claim 6,
wherein the video bitstream comprises at least the following parameters:
ols_idx;
max_tid;
lower_ols_idx_inclusive;
wherein ols_idx and max_tid indicate the operating point for which the sample of the plurality of samples, which is associated with the sample group belongs to the last access unit in the coded layer-wise video sequence,
wherein lower_ols_idx_inclusive indicates whether the end of sequence network abstraction layer unit applies only to the output layer set with the index indicated through ols_idx or to any output layer set with the index from 0 to ols_idx.

8. A file parser according to claim 7,
wherein the sample group is defined based on a class definition which is defined as follows:

```
class EndOfSequenceSampleEntry( )
extends VisualSampleGroupEntry ('eos ')
{
   unsigned int(9) ols_idx;
   unsigned int(3) max_tid;
   unsigned int(1) lower_ols_idx_inclusive;
   unsigned int(4) reserved;
   unsigned int(16) eosNalUnitLength;
   bit(8*eosnalUnitLength) eosNalUnit;
}
``` wherein eosNalUnitLength indicates the length in bytes of the end of sequence network abstraction layer unit,
wherein eosNalUnit comprises the end of sequence network abstraction layer unit as specified in ISO/IEC 23090-3.

9. A file parser according to claim 1,
wherein the input video bitstream comprises one or more tracks, wherein each of the one or more tracks comprises one or more samples of the plurality of samples,
wherein the file parser is configured to receive the input video bitstream, wherein each of the one or more tracks that is mapped to the sample group does not comprise an end of sequence network abstraction layer unit within the one or more samples of said track,
wherein the file parser is configured to generate an output video bitstream from the input video bitstream depending on the one or more tracks of the input video bitstream.

10. A file parser according to claim 1,
wherein, to generate the output video bitstream, the file parser is configured to insert an end of sequence network abstraction layer unit indicated by the sample group into an sample of the plurality of samples of the input video bitstream, the sample being associated with the sample group.

11. A file parser according to claim 10,
wherein the sample group or information within the input video bitstream, which is associated with the sample group, comprises the end of sequence network abstraction layer unit.

12. A file parser according to claim 10,
wherein the sample group or information within the input video bitstream, which is associated with the sample group, comprises information on the end of sequence network abstraction layer unit, such that the end of sequence network abstraction layer unit is extractable from the sample group.

13. A file parser according to claim 1,
wherein, if a video decoder application programming interface of a video decoder allows to provide a variable that indicates that a next sample of the plurality of samples in a layer is a first sample of a coded layer-wise video sequence, the file parser is configured
   to not insert an end of sequence network abstraction layer unit into a current sample of the plurality of samples that is mapped to the sample group to generate the output video bitstream,
   to provide information on said the variable in a subsequent sample of the plurality of samples that immediately follows the current sample.

14. A file parser according to claim 1,
wherein the input video bitstream comprises the indication that said sample of the plurality of samples of the input video bitstream, which does not comprise the network abstraction layer unit, should comprise the network abstraction layer unit, the network abstraction layer unit being an end of sequence network abstraction layer unit,
wherein the file parser is to insert said end of sequence network abstraction layer unit into said sample.

15. A file parser according to claim 1,
wherein the sample group or information within the input video bitstream, which is associated with the sample group, indicates a layer index of a layer of one or more layers and a maximum temporal index of the layer separately.

16. A file parser according to claim 15,
wherein the input video bitstream comprises at least the following parameter:
max_tid;
wherein max_tid indicates the operating point for which the sample of the plurality of samples, which is associated with the sample group belongs to the last access unit in the coded layer-wise video sequence.

17. A file parser according to claim 1,
wherein the network abstraction layer unit is a non-video coding layer network abstraction layer unit.

18. A method for generating an output video bitstream from a file,
wherein the method comprises receiving the file being an input video bitstream, wherein the input video bitstream has a video encoded therein, the input video bitstream comprising a sample group, wherein the sample group comprises a network abstraction layer unit; and/or wherein the input video bitstream comprises an indication that an access unit of a plurality of access units of the input video bitstream or a sample of a plurality of samples of the input video bitstream, which does not comprise the network abstraction layer unit, should comprise the network abstraction layer unit,
wherein the method comprises generating the output video bitstream from the input video bitstream depending on the sample group,
wherein the network abstraction layer unit is an end of sequence network abstraction layer unit, and
wherein the sample group or information within the input video bitstream, which is associated with the sample group, indicates an operating point for which a sample of the plurality of samples, which is associated with the sample group belongs to a last access unit in a coded layer-wise video sequence.

19. A method for generating a file,
wherein the method comprises receiving an input video bitstream, wherein the input video bitstream has a video encoded therein,
wherein the method comprises generating the file being an output video bitstream from the input video bitstream,
wherein generating the output video bitstream is conducted such that the output video bitstream comprises a sample group, the sample group comprising a network abstraction layer unit; and/or wherein the output video bitstream comprises an indication that an access unit of a plurality of access units of the output video bitstream or a sample of a plurality of samples of the output video bitstream, which does not comprise the network abstraction layer unit, should comprise the network abstraction layer unit,
wherein the network abstraction layer unit is an end of sequence network abstraction layer unit, and
wherein the sample group or information within the input video bitstream, which is associated with the sample group, indicates an operating point for which a sample of the plurality of samples, which is associated with the sample group belongs to a last access unit in a coded layer-wise video sequence.

20. A non-transitory digital storage medium having stored thereon a computer program for performing a method for generating an output video bitstream from a file,
wherein the method comprises receiving the file being an input video bitstream, wherein the input video bitstream has a video encoded therein, the input video bitstream comprising a sample group, wherein the sample group comprises a network abstraction layer unit; and/or wherein the input video bitstream comprises an indication that an access unit of a plurality of access units of the input video bitstream or a sample of a plurality of samples of the input video bitstream, which does not comprise the network abstraction layer unit, should comprise the network abstraction layer unit,
wherein the method comprises generating the output video bitstream from the input video bitstream depending on the sample group,
wherein the network abstraction layer unit is an end of sequence network abstraction layer unit, and
wherein the sample group or information within the input video bitstream, which is associated with the sample group, indicates an operating point for which a sample of the plurality of samples, which is associated with the sample group belongs to a last access unit in a coded layer-wise video sequence,
when said computer program is run by a computer.

* * * * *